UNITED STATES PATENT OFFICE 2,511,210

METHINE DYESTUFFS

John David Kendall and Harry Derek Edwards, Ilford, England, assignors to Ilford Limited, Ilford, England, a British company No Drawing. Application March 19, 1947, Serial No. 735,819. In Great Britain April 1, 1946

11 Claims. (Cl. 260—240)

This invention relates to the production of organic compounds and to the optical sensitisation of silver halide photographic emulsions.

In our application Serial No. 687,939, now Patent No. 2,493,071, we have described processes whereby organic compounds may be obtained having the general formula:

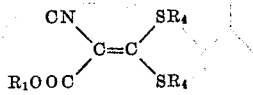

(i. e. compound (1) in Figure 4 of the formulae drawings accompanying that application), where $R_1$ is a hydrocarbon group and $R_4$ is an alkyl group. By the use of an aralkylating agent instead of an alkylating agent in the process of that application compounds may be obtained in which $R_4$ is an aralkyl group.

It has now been discovered that such compounds react with compounds containing reactive methylene groups or reactive NH groups to form organic compounds many of which are sensitising dyes for silver halide photographic emulsions.

According to the present invention, therefore, useful organic compounds are obtained by condensing a compound of the general Formula I:

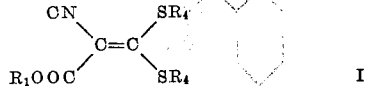

where $R_1$ is a hydrocarbon group and $R_4$ is alkyl or aralkyl, with a heterocyclic nitrogen compound containing a reactive methylene group, in the presence of a basic condensing agent. The reactive methylene group may be intracyclic or extracyclic.

In particular, according to this invention, a compound of general Formula I is condensed with a compound of general Formula II:

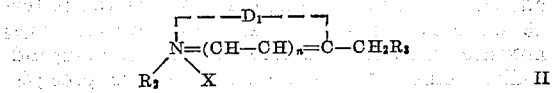

where $R_2$ is an alkyl, hydroxyalkyl, aralkyl or hydroxyaralkyl group, $R_3$ is a hydrogen atom or an alkyl or aralkyl group, X is an acid radicle and $D_1$ is the residue of a five-membered or six-membered heterocyclic ring, or with a compound of general Formula III:

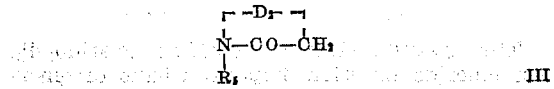

where $D_2$ is the residue of a heterocyclic nitrogen keto-methylene ring and $R_5$ is a hydrogen atom or a hydrocarbon group.

Where the second reagent is a compound of general Formula III, which corresponds to the more specific Formula IV:

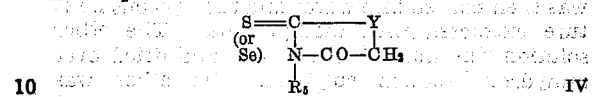

where Y is an oxygen atom or a sulphur atom, the product may be converted to an alkyl or aralkyl salt and this reacted with a compound containing a reactive methylene or NH group. A series of reactions may be effected in an analogous manner to that described in U. S. Patent No. 2,388,963.

The groups $R_1$ and $R_5$ may be any hydrocarbon groups, e. g. alkyl, aralkyl or aryl and, as stated above, the groups $R_2$, $R_3$ and $R_4$ may also be alkyl or aralkyl. Alkyl groups may be methyl, ethyl, propyl, butyl or higher alkyl, and aralkyl groups may be, for example, benzyl and naphthylmethyl. In addition groups $R_1$ and $R_5$ may be aryl, e. g. phenyl or naphthyl.

The residue $D_1$ may be, for example, the residue of any of the types of heterocyclic nuclei commonly employed in photographic sensitising dyes, e. g. thiazoles, oxazoles, selenazoles and their polycyclic homologues such as those of the benzene, naphthalene, acenaphthene and anthracene series; pyridine and its polycyclic homologues such as quinoline and α and β naphthaquinolines; lepidines; indolenines; diazines such as pyrimidines and quinazolines; diazoles (e. g. thio-ββ'-diazole); oxazolines, thiazolines and selenazolines. The polycyclic compounds of these series may be substituted in the carbocyclic rings by one or more groups such as alkyl, aryl, amino, hydroxy, alkoxy and methylene-dioxy groups or by halogen atoms.

The compounds of general Formula III may be, for example, rhodanic acid (2-thio-4-keto-tetrahydrothiazole) oxarhodanic acid (2-thio-4-keto-tetrahydro-oxazole) and the N-hydrocarbon derivatives of such compounds, oxindoles, pyrazole-5-ones, hydantoin, thiohydantoin, ψ-hydantoin and ψ-thio-hydantoin.

The acid radicle X may be, for example, a halide radicle (chloride, bromide or iodide), alkyl sulphate or p-toluene sulphonate.

The reaction, as stated above, is carried out in the presence of a basic condensing agent. This may be organic or inorganic and examples are pyridine, triethylamine and sodium acetate.

The dyes produced using a reagent of general Formula II have the probable formula:

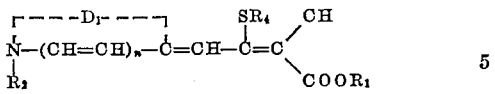

and the dyes produced using a reagent of general Formula III have the probable formula:

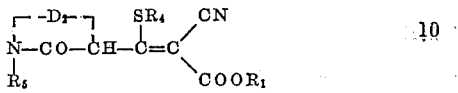

The dyes obtained according to the invention are valuable sensitisers for photographic silver halide emulsions.

The following examples illustrate the invention:

Example 1

Equimolecular quantities of β-cyano-β-carbethoxyketene di-methylmercaptal, p-toluquinaldine and methyl-p-toluene sulphonate were fused together for 3 hours at 100° C. The product was dissolved in pyridine and the solution boiled gently under reflux for 10 minutes. Methyl mercaptan was evolved. The reaction mixture was then poured into water and the aqueous mixture extracted with diethyl ether. The ether solution was washed with water and dried over anhydrous sodium sulphate. The ether was then evaporated leaving an oil which hardened on lixiviation with petroleum ether yielding the solid dye. On recrystallisation from a mixture of benzene and petroleum ether it was obtained as crystals melting at 114° C. The dye had the probable formula:

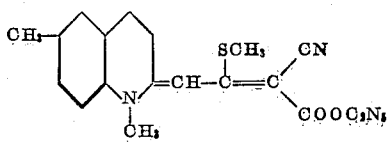

Example 2

The procedure of Example 1 was followed using 1-methyl benzthiazole instead of p-toluquinaldine. On pouring the reaction mixture into water the dye precipitated as an oil which hardened on standing into shining brown crystals. The recrystallised product melted at 158° C. and had the probable formula:

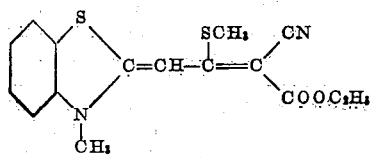

This dyestuff, when incorporated in a gelatino silver chloride emulsion, imparts a band of sensitivity extending to 5500 Å. with a maximum at 5100 Å. Included in a gelatino silver iodobromide emulsion the maximum sensitivity is at 5300 Å.

Example 3

The procedure of Example 1 was followed using 1-methyl benzselenazole instead of p-toluquinaldine. The reaction mixture was poured into a 10% solution of potassium iodide instead of into plain water. The crude dye precipitated as brown crystals. However it was contaminated with some symmetrical selenocarbocyanine dye. By using potassium iodide solution this impurity was formed as the iodide and thus easily separated by extracting the crude dye with hot benzene and concentrating and diluting the benzene extract with petroleum ether, whereupon the required dye separated out. It had a melting point of 155° C. and the probable formula:

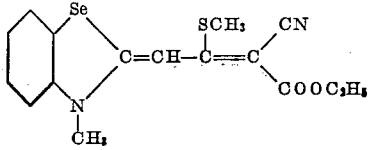

This dyestuff, included in a gelatino silver chloride emulsion, imparted a band of sensitivity extending to 5000 Å. with a maximum at 4700 Å.

Example 4

The procedure of Example 1 was followed using 1-methyl benzoxazole instead of the p-toluquinaldine. Refluxing was continued for 80 minutes and the reaction mixture was poured into aqueous alcohol instead of plain water. The dye precipitated and after recrystallisation from a mixture of benzene and petroleum ether was obtained as crystals melting at 126° C. It had the probable formula:

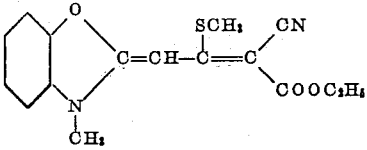

This dyestuff, included in a gelatino silver chloride emulsion, imparted a band of sensitivity extending to 4800 Å. with a maximum at 4500 Å.

Example 5

The procedure of Example 1 was followed using 1-methyl β-naphthathiazole instead of the p-toluquinaldine. The reaction mixture was poured into aqueous ethyl alcohol whereupon the dye precipitated. The dye was purified by recrystallisation from methyl alcohol. It had a melting point of 211° C. and the probable structure:

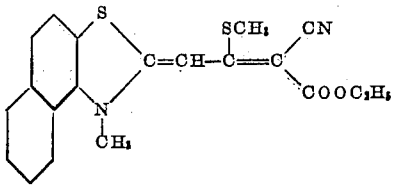

This dyestuff, when included in a gelatino silver iodobromide emulsion, imparts a band of sensitivity with a maximum at 5450 Å.

Example 6

Equimolecular quantities of β-cyano-β-carbethoxyketene di-methylmercaptal and N-ethyl rhodanic acid were dissolved in ethyl alcohol and an equimolecular quantity of triethylamine was added. The mixture was boiled under reflux for 15 minutes and then poured into water. The mixture was then acidified with acetic acid and sodium chloride was added. The dye precipitated and after recrystallisation from methyl alcohol was obtained as crystals melting at 98° C. It forms an orange coloured silver salt and has the probable formula:

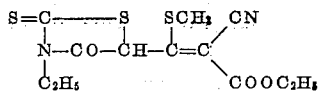

This dyestuff, when included in a gelatino silver chloride emulsion, imparts a band of sensi-

Example 7

Equimolecular quantities of β-cyano-β-carbethoxyketene dimethylmercaptal, μ-methyl thiazoline and methyl p-toluene sulphonate were fused together for 2 hours at 100° C. The product was dissolved in pyridine and the solution boiled gently under reflux for 20 minutes. The reaction mixture was then poured into aqueous ethyl alcohol. On dilution with water, the dye precipitated. It was separated and recrystallised from methyl alcohol solution yielding the product as crystals melting at 129° C. It had the probable formula:

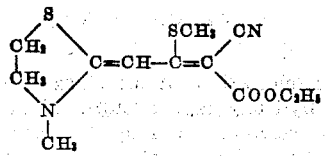

This dyestuff, when included in a gelatino silver chloride emulsion, imparts a band of sensitivity extending to 4700 A. with a maximum of 4500 A.

Example 8

Equimolecular quantities of β-cyano-β-carbethoxyketene dimethylmercaptal, 1-methyl benzthiazole and ethyl p-toluene sulphonate were fused together for 24 hours at 100° C. The mixture was then boiled gently under reflux in pyridine for 15 minutes. The dye precipitated and, after filtration and recrystallisation from methyl alcohol, was obtained as mauve crystals melting at 146° C. and giving a bright yellow solution in alcohol. The dye had the probable formula:

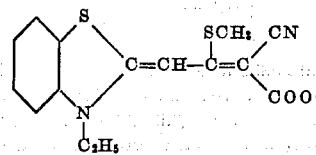

The above dyestuff, when included in a gelatino silver iodobromide emulsion, imparted a band of sensitivity with a maximum at 5300 A.

Example 9

Equimolecular quantities of β-cyano-β-carbethoxyketene diethylmercaptal, 1-methyl benzthiazole and methyl p-toluene sulphonate were fused at 100° C. for one hour. The reaction mixture was then dissolved in ethyl alcohol and one molecular equivalent of triethylamine was added. The reaction mixture was then boiled gently under reflux for 15 minutes and then poured into aqueous alcohol. The dye precipitated and, on separation and recrystallisation from methyl alcohol, was obtained as crystals melting at 148° C. The dye had the probable formula:

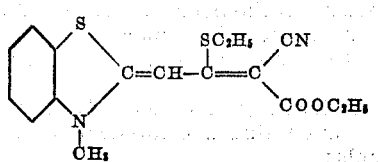

The above dyestuff, when included in a gelatino silver iodobromide emulsion, imparts a band of sensitivity extending to 5600 A. with a maximum at about 5300 A.

Example 10

Equimolecular quantities of β-cyano-β-carbethoxyketene diethylmercaptal, and 1-methyl benzthiazole β-hydroxy ethiodide were boiled gently under reflux with ethyl alcohol and an equimolecular quantity of triethylamine. The boiling was continued for 5 minutes and then the reaction mixture was cooled and diluted with a little water. The dye precipitated and was purified by extraction with anhydrous diethyl ether followed by recrystallisation from ethyl alcohol. It was thus obtained as red rhombs with a blue reflex, melting at 152° C. It had the probable formula:

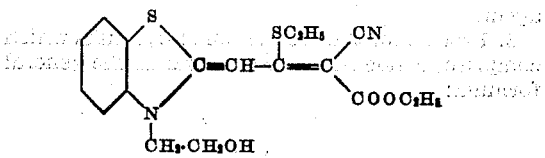

The above dyestuff, when included in a gelatino silver iodobromide emulsion, imparts a band of sensitivity extending to 5500 A.

Example 11

Equimolecular quantities of β-cyano-β-carbethoxyketene dibenzylmercaptal and 1-methyl benzthiazole methiodide were boiled under reflux in ethyl alcohol solution for 15 minutes. The solution was cooled and diluted with a little water, whereupon the dye precipitated. On recrystallisation from ethyl alcohol it was obtained as bright red crystals, melting at 155° C. It had the probable formula:

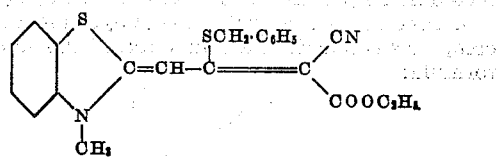

The above dyestuff, when included in gelatino silver iodobromide emulsion, imparts a band of sensitivity extending to 5500 A.

The dyes of this invention are of especial value not only as normal photographic sensitising dyes but in the production of variable contrast emulsions according to the method of U. S. Patent No. 2,280,300.

What we claim is:

1. Process for the production of dyestuffs which comprises condensing a compound of the general formula:

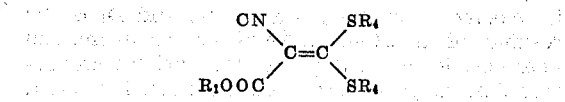

where $R_1$ is a hydrocarbon group and $R_4$ is selected from the class consisting of alkyl and aralkyl groups with a heterocyclic nitrogen compound containing a reactive methylene group, the said condensation being effected in the presence of a basic condensing agent.

2. Process for the production of dyestuffs which comprises condensing a compound of the general formula:

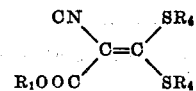

where $R_1$ is a hydrocarbon group and $R_4$ is selected from the class consisting of alkyl and aralkyl groups with a compound of the general formula:

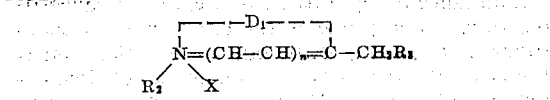

where $R_2$ is selected from the class consisting of alkyl and hydroxyalkyl groups, $R_3$ is selected from the class consisting of the hydrogen atom and alkyl and aralkyl groups, X is an acid radicle, $n$ is selected from nought and one, and $D_1$ is the residue of a five-membered or six-membered heterocyclic ring, the said condensation being effected in the presence of a basic condensing agent.

3. Process for the production of dyestuffs which comprises condensing a compound of the general formula:

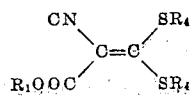

where $R_1$ is a hydrocarbon group and $R_4$ is selected from the class consisting of alkyl and aralkyl groups with a compound of the general formula:

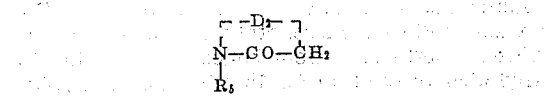

where $D_2$ is the residue of a heterocyclic nitrogen ketomethylene ring, and $R_5$ is selected from the class consisting of the hydrogen atom and hydrocarbon groups, the said condensation being effected in the presence of a basic condensing agent.

4. Process for the production of dyestuffs which comprises condensing a compound of the general formula:

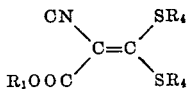

where $R_1$ is a lower alkyl group and $R_4$ is selected from the class consisting of alkyl and aralkyl groups with a compound of the general formula:

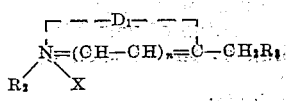

where $R_2$ is selected from the class consisting of alkyl and hydroxyalkyl groups, $R_3$ is selected from the class consisting of the hydrogen atom and alkyl and aralkyl groups, X is an acid radicle, $n$ is selected from nought and one, and $D_1$ is the residue of a five-membered or six-membered heterocyclic ring, the said condensation being effected in the presence of a basic condensing agent.

5. Process for the production of dyestuffs which comprises condensing a compound of the general formula:

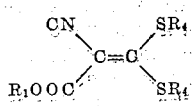

where $R_1$ is a hydrocarbon group and $R_4$ is a lower alkyl group with a compound of the general formula:

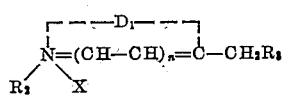

where $R_2$ is selected from the class consisting of alkyl and hydroxyalkyl groups, $R_3$ is selected from the class consisting of the hydrogen atom and alkyl and aralkyl groups, X is an acid radicle, $n$ is selected from nought and one, and $D_1$ is the residue of a five-membered or six-membered heterocyclic ring, the said condensation being effected in the presence of a basic condensing agent.

6. Process for the production of dyestuffs which comprises condensing a compound of the general formula:

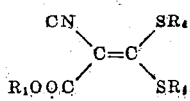

where $R_1$ is a hydrocarbon group and $R_4$ is a lower alkyl group with a compound of the general formula:

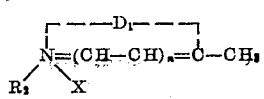

where $R_2$ is selected from the class consisting of alkyl and hydroxyalkyl groups, X is an acid radicle, $n$ is selected from nought and one, and $D_1$ is the residue of a five-membered or six-membered heterocyclic ring, the said condensation being effected in the presence of a basic condensing agent.

7. Process for the production of dyestuffs which comprises condensing a compound of the general formula:

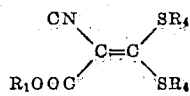

where $R_1$ is a lower alkyl group and $R_4$ is selected from the class consisting of alkyl and aralkyl groups with a compound of the general formula:

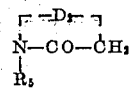

where $D_2$ is the residue of a heterocyclic nitrogen ketomethylene ring, and $R_5$ is selected from the class consisting of the hydrogen atom and hydrocarbon groups, the said condensation being effected in the presence of a basic condensing agent.

8. Process for the production of dyestuffs which comprises condensing a compound of the general formula:

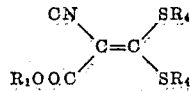

where $R_1$ and $R_4$ are lower alkyl groups with a compound of the general formula:

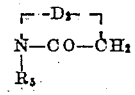

where $D_2$ is the residue of a heterocyclic nitrogen ketomethylene ring, and $R_5$ is selected from the class consisting of the hydrogen atom and hydrocarbon groups, the said condensation being effected in the presence of a basic condensing agent.

9. Process for the production of dyestuffs which comprises condensing a compound of the general formula:

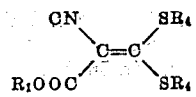

where $R_1$ and $R_4$ are lower alkyl groups with a compound of the general formula:

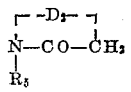

where $D_2$ is the residue of a heterocyclic nitrogen ketomethylene ring, and $R_5$ is a lower alkyl group, the said condensation being effected in the presence of a basic condensing agent.

10. A dyestuff of the formula:

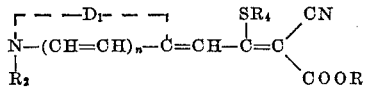

where $R_1$ is a hydrocarbon group, $R_2$ is selected from the class consisting of alkyl and hydroxyalkyl groups, $R_4$ is selected from the class consisting of alkyl and aralkyl groups, $n$ is selected from nought and one, and $D_1$ is the residue of a five-membered or six-membered heterocyclic ring.

11. A dyestuff of the formula:

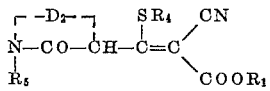

where $R_1$ is a hydrocarbon group, $R_4$ is selected from the class consisting of alkyl and aralkyl groups, $R_5$ is selected from the class consisting of the hydrogen atom and hydrocarbon groups, and $D_2$ is the residue of a heterocyclic nitrogen keto-methylene ring.

JOHN DAVID KENDALL.
HARRY DEREK EDWARDS.

REFERENCES CITED

The following references are of record in the file of this patent:

UNITED STATES PATENTS

| Number | Name | Date |
|---|---|---|
| 2,028,141 | Ackerman | Jan. 21, 1936 |
| 2,166,736 | White et al. | July 18, 1939 |
| 2,179,895 | Muller | Nov. 14, 1939 |
| 2,263,749 | White et al. | Nov. 25, 1941 |
| 2,322,015 | Hamer et al. | June 15, 1943 |
| 2,334,711 | Kendall | Nov. 23, 1943 |
| 2,340,882 | Kendall | Feb. 8, 1944 |
| 2,342,546 | Kendall | Feb. 22, 1944 |
| 2,353,164 | Kendall et al. | July 11, 1944 |
| 2,397,013 | Kendall | Nov. 19, 1946 |

OTHER REFERENCES

Chemical Abstracts 16;3101 (Abstract of Brit. Med. Journal, 1922, I 514–515).

Chemical Abstracts 19;530 (Abstract of Proc. Roy Soc., London, 96B, 317–333, 1924).